United States Patent
Lange

(10) Patent No.: US 10,439,803 B2
(45) Date of Patent: Oct. 8, 2019

(54) SECURE KEY MANAGEMENT

(71) Applicant: Microsoft Technology Licensing, LLC, Redmond, WA (US)

(72) Inventor: Jonathan E. Lange, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 172 days.

(21) Appl. No.: 15/458,627

(22) Filed: Mar. 14, 2017

(65) Prior Publication Data

US 2018/0139044 A1 May 17, 2018

Related U.S. Application Data

(60) Provisional application No. 62/421,835, filed on Nov. 14, 2016.

(51) Int. Cl.
| | |
|---|---|
| G06F 21/53 | (2013.01) |
| H04L 9/08 | (2006.01) |
| G06F 21/10 | (2013.01) |
| G06F 21/12 | (2013.01) |
| H04L 9/32 | (2006.01) |
| G06F 9/455 | (2018.01) |
| G06F 21/79 | (2013.01) |

(52) U.S. Cl.
CPC ........ *H04L 9/0819* (2013.01); *G06F 9/45558* (2013.01); *G06F 21/10* (2013.01); *G06F 21/12* (2013.01); *G06F 21/53* (2013.01); *G06F 21/79* (2013.01); *H04L 9/08* (2013.01); *H04L 9/0822* (2013.01); *H04L 9/0894* (2013.01); *H04L 9/3263* (2013.01); *G06F 2009/45587* (2013.01); *G06F 2221/2149* (2013.01)

(58) Field of Classification Search
CPC .. G06F 21/10; G06F 21/12; G06F 2221/2149; G06F 2009/45587
See application file for complete search history.

(56) References Cited

U.S. PATENT DOCUMENTS

| | | | |
|---|---|---|---|
| 9,135,444 B2 | 9/2015 | Carter et al. | |
| 9,147,086 B1 | 9/2015 | Potlapally et al. | |
| 9,270,459 B2 | 2/2016 | Mukkara et al. | |
| 9,292,317 B2 * | 3/2016 | Chen | G06F 9/455 |

(Continued)

FOREIGN PATENT DOCUMENTS

EP 2482220 A1 8/2012

OTHER PUBLICATIONS

"Intel Software Guard Extensions (Intel SGX)" (Year: 2018).*

(Continued)

*Primary Examiner* — Thaddeus J Plecha
(74) *Attorney, Agent, or Firm* — Workman Nydegger

(57) ABSTRACT

A protected machine. The machine includes an enclave. An enclave includes a protected area of an application address space for which access is prevented for any application code not resident in the enclave itself, except that keys can be provided by one or more management enclaves into the enclave. The machine further includes a management enclave coupled to the enclave. The management enclave is configured to provide a key to the enclave. The management enclave is a protected area of an application address space for which access is prevented for any application code not resident in the management enclave itself.

20 Claims, 3 Drawing Sheets

(56) References Cited

U.S. PATENT DOCUMENTS

| | | | |
|---|---|---|---|
| 9,292,673 | B2 | 3/2016 | Rutkowski et al. |
| 9,348,652 | B2 | 5/2016 | Raghu |
| 9,792,143 | B1* | 10/2017 | Potlapally ............ G06F 9/45558 |
| 2011/0302415 | A1 | 12/2011 | Ahmed et al. |
| 2012/0185946 | A1 | 7/2012 | Kamara et al. |
| 2014/0137182 | A1* | 5/2014 | Elzur ...................... H04L 63/20 726/1 |
| 2014/0281531 | A1 | 9/2014 | Phegade et al. |
| 2015/0033316 | A1 | 1/2015 | Scarlata et al. |
| 2015/0264024 | A1 | 9/2015 | Frank |
| 2015/0358313 | A1 | 12/2015 | Hussain et al. |
| 2015/0372812 | A1 | 12/2015 | Parann-nissany |
| 2016/0342801 | A1* | 11/2016 | Sreekanti ............. G06F 21/6209 |
| 2017/0177457 | A1* | 6/2017 | Swanson ................... G06F 1/24 |
| 2018/0097809 | A1* | 4/2018 | Chakrabarti ............ H04L 63/10 |
| 2018/0114012 | A1* | 4/2018 | Sood ....................... G06F 21/53 |

OTHER PUBLICATIONS

John M. et al., "Intel® Software Guard Extensions Tutorial Series: Part 1, Intel® SGX Foundation", 11 pages (Year: 2016).*

"International Search Report and Written Opinion Issued in PCT Application No. PCT/US2017/060261", dated Jan. 29, 2018, 10 Pages.

Lohr, et al., "Securing the E-Health Cloud", In Proceedings of the 1st ACM International Health Informatics Symposium, Nov. 11, 2010, pp. 1-10.

Hein, et al., "Secure Block Device—Secure, Flexible, and Efficient Data Storage for ARM TrustZone Systems", In Proceedings of Trustcom/BigDataSE/ISPA, Aug. 20, 2015, pp. 222-229.

* cited by examiner

SECURE KEY MANAGEMENT

CROSS-REFERENCE TO RELATED APPLICATIONS

This application claims the benefit of and priority to U.S. Provisional Patent Application Ser. No. 62/421,835 filed on Nov. 14, 2016 and entitled "Secure Key Management," which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

In cloud computing systems, there is a cloud service provider and tenant customers. While the tenant customers desire to use the cloud computing system resources, these customers will generally not want individuals at the cloud service provider, e.g., cloud service provider employees or others having physical access to cloud service provider resources, to have access to the customer's data. Thus, there is a desire by tenant customers for a third party to administer data without actually being able to view the data.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a machine. The machine includes an enclave. An enclave includes a protected area of an application address space for which access is prevented for any application code not resident in the enclave itself, except that keys can be provided by one or more management enclaves into the enclave. The machine further includes a management enclave coupled to the enclave. The management enclave is configured to provide a key to the enclave. The management enclave is a protected area of an application address space for which access is prevented for any application code not resident in the management enclave itself.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated here in include functionality for hardware based key protection systems and hardware based protection for virtual machines (VMs) in cloud computing systems. In particular, some modern processors include hardware instructions and architecture components that can be used to protect selected code and data from disclosure or modification. Applications can be partitioned into CPU-hardened "enclaves" or protected areas of execution that increase security. In particular, as used herein, an enclave is a protected area of an application's address space for which access is prevented for any software not resident in the enclave itself. This security can be maintained even on compromised platforms because the protected data and code is protected at the CPU level. That is, the CPU can prevent external software from accessing the enclave. These enclaves can be used to implement secure tenant data encryption key transfers and secure virtual machines for operating on tenant data. One example of such enclaves and protected computing is available in the Intel SGX (Software Guard Extensions) available from Intel Corporation of Santa Clara, Calif.

Figure 1:
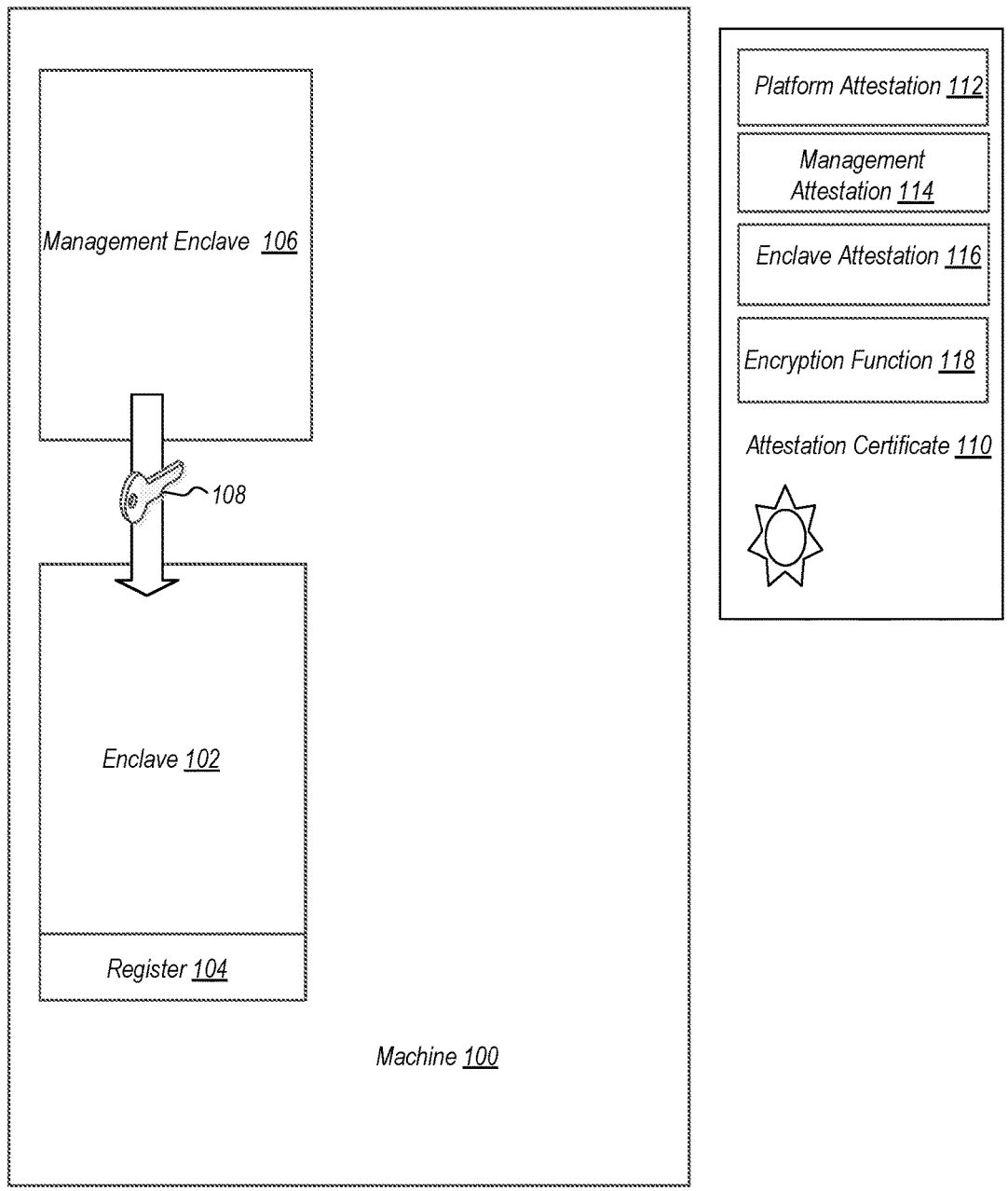
FIG. 1 illustrates a machine including a management enclave and an enclave, and a attestation certificate.

FIG. 1 illustrates a machine 100. The machine 100 is a physical hardware device configured to execute programming instruction. For example, a machine may include a central processing unit (CPU). The machine includes an enclave 102. The enclave 102 is a protected area of execution including protected code and data. The enclave 102 is protected in that it has limited (as limited at the CPU level) ingress and egress. In particular, once execution code and/or data is placed into the enclave, it cannot be inspected by any external entity. This includes both processor state and register state. Further, it cannot be modified by an external entity. Data can be placed into an external register 104, which code running in the enclave 102 can access, but the enclave 102 will access this code as it needs. Data cannot be provided by force into the enclave 102, except as illustrated below, where a management enclave 106 can provide keys, such as key 108 into the enclave 102.

As noted, FIG. 1 illustrates a management enclave 106. The management enclave is similar to the enclave 102 in that it is a protected area of execution. One difference, however, is that the management enclave 106 has the ability to provide keys, such as key 108 into the enclave 102.

While there is limited egress from the enclave 102, one item that the enclave 102 can produce and provide external to the enclave 102 is an attestation certificate 110. The attestation certificate 110 can include verifiable information used to authenticate that the enclave is running on a particular platform, managed by a particular management enclave along with information about the enclave 102 itself.

In particular, the attestation certificate 110 produced by the enclave 102 includes a platform attestation 112. The platform attestation 112 includes verifiable proof that the enclave 102 is being implemented on a particular platform. This may include, for example, the particular machine 100. For example, the machine 100 may include a serial number or other characteristics or components that can be evaluated to create the verifiable proof which is unique to the particular machine 100. For example, a hashing algorithm may be used to create the verifiable proof using a serial number of the processor and/or other characteristics or components of the machine 100. For example, the hashing algorithm may hash on serial numbers of different components in the machine 100, a set of certain model numbers (or other characteristics) of components in the machine 100, or other characteristics of the machine 100.

Alternatively, this may simply be verifiable proof that the platform to which the machine 100 belongs generally has enclave support. For example, verifiable proof may be provided that the machine 100 includes enclave support.

The attestation certificate 110 produced by the enclave 102 includes a management attestation 114. The management attestation 114 includes verifiable proof, such as a fingerprint of the enclave 102, that the enclave 102 is being managed by the management enclave 106. For example, code in the management enclave may be used to create verifiable proof that the management enclave is being used to manage the enclave 102. For example, a hashing algorithm may applied to code and/or data of the management enclave 106 to produce the verifiable proof, which can then be used in the management attestation 114.

The attestation certificate 110 produced by the enclave 102 includes an enclave attestation 116. The enclave attestation 116 includes verifiable proof for the enclave. For example, the enclave attestation 116 may include a fingerprint of the code and/or data in the enclave 106.

The attestation certificate 110 produced by the enclave 102 includes an encryption function 118. The encryption function 118 can be used to encrypt data that is then placed in the register 104. For example, the encryption function 118 can be used as part of a public key exchange for public key exchange schemes such as a Diffie-Hellman key exchange. In this way, data can be provided securely to the enclave 102.

Figure 2:
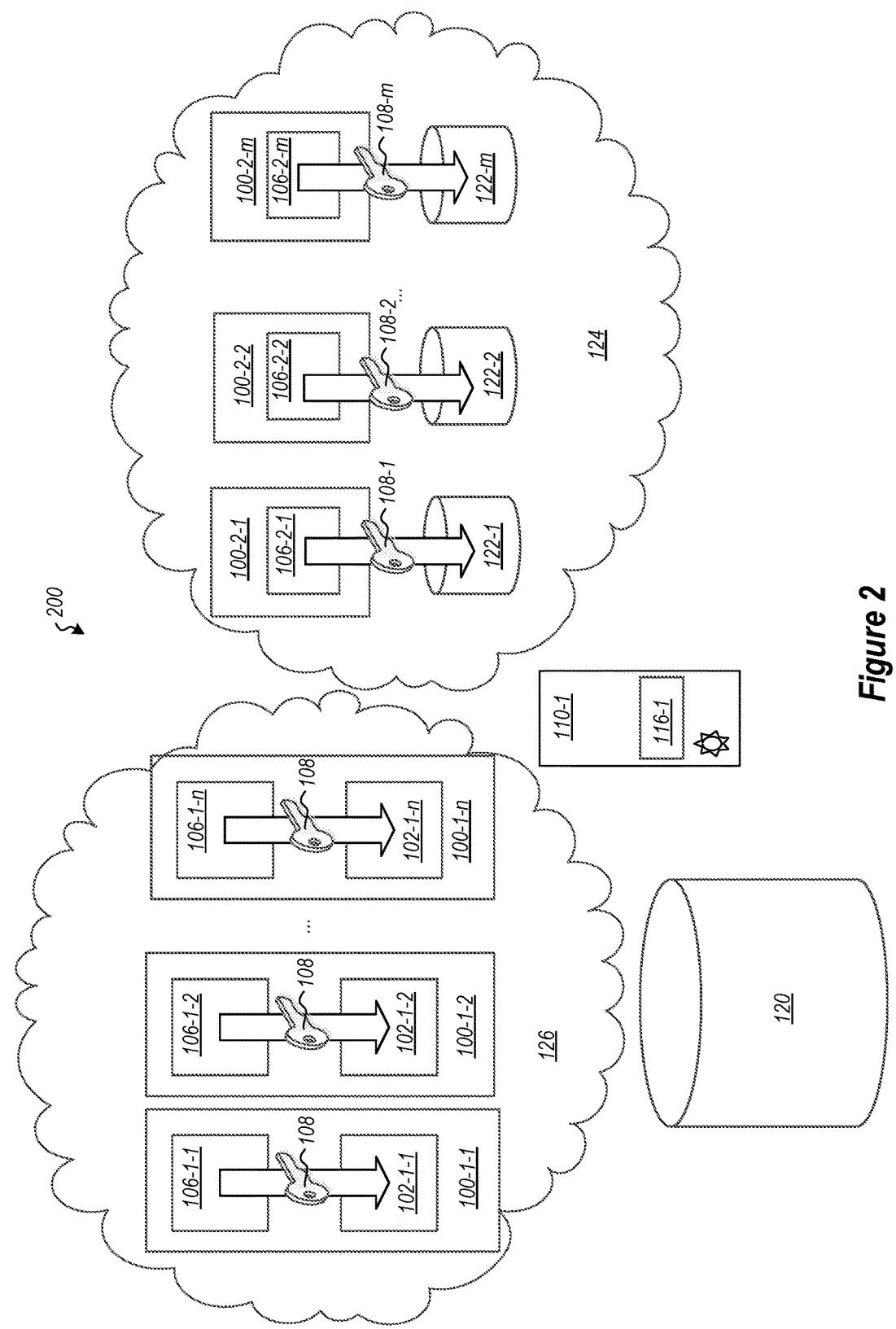
FIG. 2 illustrates a cloud system including a compute fabric and a key fabric.

With this foundation, attention is directed to FIG. 2, which illustrates a use of this specialized processor functionality in implementing virtual machines for tenants of a cloud service. In particular, typically a customer tenant of a cloud service 200 does not have a secure infrastructure so they purchase resources from the cloud service provider, which is able to provide the secure infrastructure. In a cloud service 200, cloud resources, such as compute resources (e.g., processor cycles), memory resources, and storage resources are shared among a number of different tenants. Physical machines in the cloud service 200 host the resources and provide the resources for various tenants as needed. However, the tenant also does not want the cloud service provider to have access to unencrypted tenant data. Thus, a particular tenant has a key 108 associated with their data that is used in a secure way to ensure that the tenant's data 120 is not exposed to other tenants or to individuals at the cloud service 200. Because resources on different machines are shared, and different machines may be used for different tenants at different times, the key 108 needs to be shareable among the different machines, held by cloud service 200, and verifiable proof needs to be provided that cloud service 200 does not know the value for the key 108.

In the illustrated example, this can be accomplished by using a key management fabric 124 and a compute fabric 126.

The key management fabric 124 comprises a number of machines 110-2-1 through 100-2-*m* that are selected from the machines at the could service 200 and are configured to manage the key 108 for the specific tenant. In this way, the key can be redundantly stored for the tenant with as many levels of redundancy as desired.

Each machine in the key management fabric 124 is coupled to local storage 122-1 through 122-*m* respectively.

FIG. 2 illustrates the compute fabric 126. The compute fabric comprises a number of machines 100-1-1 through 100-1-*n* that are selected from the machines available at the cloud service 200 and are configured to implement virtual machines for the tenant. In particular, the tenant will want certain virtual machines to run for the tenant. These virtual machines can be implemented using the enclaves 102-1-1 through 102-1-*n*. In particular, VM code can be implemented in the enclaves 102-1-1 through 102-1-*n*. The code for each enclave could be provided by the cloud service provider or could be provided by the tenant to the cloud service provider to implement enclaves for the tenant. In either case, the tenant can verify the VMs by examining an attestation certificate produced by the enclaves running the VMs, including an enclave attestation for each enclave having a fingerprint for the enclave.

Note that the machines 100-1-1 through 100-1-*n* and 100-2-1 through 100-2-*m* each have a management enclave 106-1-1 through 106-1-*n* and 106-2-1 through 106-2-*m* respectively. In some embodiments, the management enclaves 106-1-1 through 106-1-*n* and 106-2-1 through 106-2-*m* all have the same executable code running in them. Thus, enclaves on the machines for the tenant, whether in the key fabric 124 or the compute fabric 126 will all produce an attestation certificate with the same management attestation, such as that illustrated in FIG. 1. This allows each of the management enclaves 106-1-1 through 106-1-*n* and 106-2-1 through 106-2-*m* to communicate with each other in a secure way and to reject communication with any management enclaves that cannot produce the management attestation. Using this functionality, secure key creation and management can be accomplished for a particular tenant.

Although, it should be noted, as discussed in more detail below, other modalities may be used to verify management enclaves. For example, in alternative embodiments, two management enclaves who do not share the same fingerprint can still recognize one another as trustworthy. Enclaves can implement complex and flexible policy. Thus, for example, management enclaves 106-1-1 through 106-1-*n* may be different and have a different fingerprint than management enclaves 106-2-1 through 106-2-*m*, but may still be able to communicate with each other based on a trustworthiness analysis. Similarly, one or more of the management enclaves 106-1-1 through 106-1-*n* may be different from each other but still able to communicate with each other based on a trustworthiness analysis. Similarly, one or more of the management enclaves 106-2-1 through 106-2-*m* may be different from each other but still able to communicate with each other based on a trustworthiness analysis.

For example, in some embodiments, a management enclave may be able to determine that another management enclave is running a different version of the same code. This can be accomplished, for example, by examining the enclave attestation (e.g., enclave attestation 116) of an attestation certificate (e.g., attestation certificate 110) to verify information related to a code author, a signing authority, or in other ways. For example, the enclave attestation may include an indicator created using all three of an indication of a signing authority, an indication of a signing authority declaration of what the functionality of the code is, and an indication of a signing authority declared version of the code. A receiving management enclave may include functionality for verifying these three indicators.

Thus, management enclaves may have matching functionality baked into the management enclave code. This matching functionality may be configured to require an exact match in an enclave attestation or could allow for approved changes.

For example, consider the following scenarios. In a first scenario, management enclave 106-2-1 produces an attestation certificate 110-1. The attestation certificate 110-1 includes an enclave attestation 116-1. The enclave attestation 116-1 includes information about the management enclave 106-2-1. For example, in the present scenario illustrated, the management enclave 106-2-1 may include functionality to compute a hash of the code implementing the management enclave 106-2-1. In this example, management enclaves require matching code to trust other. Thus, if the management enclave 106-1-1 receives the attestation certificate 110-1, the management enclave 106-1-1 will only trust the management enclave 106-2-1 if the enclave attestation 116-1 can be produced by the management enclave 106-1-1 by hashing its own management enclave code.

In an alternative embodiment, management enclaves may be able to determine that other management enclaves can be trusted even when those other management enclaves are not running the exact same code. For example, the management enclave 106-2-1 may produce an attestation certificate 110-1 that includes an enclave attestation 116-1 that is based on verifiable proof of the author of the management enclave code running in the management enclave 106-2-1, verifiable proof of the purpose of the enclave code running in the management enclave 106-2-1, and verifiable proof of a version of the management enclave code running in the management enclave 106-2-1. Each of the management enclaves, including management enclave 106-1-1, may include functionality for receiving the attestation certificate 110-1 and verifying the enclave attestation 116-1.

The following illustrates various example of how verification functions in some embodiments. The attestation certificate contains information which can uniquely identify an enclave. This includes a digital fingerprint of all of the code and data that were loaded into the enclave when it was created, and can optionally also include identifying information signed by some trusted authority. In the simplest case, verification (e.g. between two management enclaves) can be performed by a management enclave doing something like the following:

1) Ask the other management enclave to send an attestation report.

2) Verify that the attestation report from the other management enclave is correctly signed by the remote system to indicate that it is a trustworthy attestation report.

3) Ask the CPU to prepare an attestation report for itself (trustworthy because it came directly from the CPU).

4) Compare the identity information present in the self-attestation with the identity information present in the remote attestation. If they match, then the management enclave is talking to another copy of itself, and therefore can trust it.

An alternative version, used by management enclaves of different versions, or used between an enclave and a management enclave, would be to replace steps 3-4 with a comparison of identity information in the remote attestation against policy information used to determine which identities represent trustworthy enclaves.

The key 108 can be stored redundantly in the key fabric 124. The key 108 can be obtained by the key fabric 124 in a number of different ways. For example, in some embodiments, the tenant may provide the key 108 to one of the management enclaves, such as management enclave 106-2-1. Alternatively, the management enclaves may include functionality for obtaining the key 108 from a machine. Thus, for example, the management enclave 106-2-1 may request that a CPU at the machine 100-2-1 calculate an appropriate key using an appropriate algorithm.

To redundantly store the key 108, the management enclaves 106 are able to share the key with each other, but will not share they key with other entities, including other compromised management enclaves or, in some embodiments, other management enclaves that are not running the same code (or an approved and verifiable version of code, e.g., a different version of the management enclave code), except that the management enclaves 106 can provide the key 108 in associated enclaves so that those associated enclaves can decrypt the tenant's data. As noted above, the management enclave 106-2-1 may request that a CPU at the machine 100-2-1 calculate an appropriate key using some appropriate algorithm. The root of that derivation is the key which is later provided by the management enclave to other enclaves. Consequently, the management enclave provides the key into a location that the CPU uses for key derivation. In alternative embodiments, the management enclave places the key into a special register at another machine to provide the key.

A management enclave will not provide the key 108 to another management enclave unless the management enclave can determine that the another management enclave is trusted, such as in some embodiments, by determining that the management enclave running the same management enclave code, or other approved code, such as that described above. This can be accomplished by examining the attestation certificates of the management enclaves to determine that the management attestations match. Thus, in this example, a management enclave can determine that another management enclave has the same fingerprint, or an approved fingerprint, and can therefore it is safe to communicate with the other management enclave.

Each of the management enclaves 106-2-1 through 106-2-*m* encrypt the management key using a machine key unique to the particular machine on which the management enclave is running to create encrypted keys 108-1 through 108-*m* respectively and store the encrypted keys 108-1 through 108-*m* in storage 122-1 through 122-*m* associated with their respective machines. Each of the management enclaves 106-2-1 through 106-2-*m* are configured to store encrypted tenant keys in storage locally and exclusively on its respective machine. That is, management enclaves that run in the key management fabric have the ability to store customer keys in an encrypted form on their local storage, and on their local storage only.

To spin up a virtual machine, a machine in the compute fabric 126 will spin up a management enclave 106 and an enclave 102. For example, in the example, illustrated in FIG. 2, the machine 100-1-1 spins up the management enclave 106-1-1 and the enclave 102-1-1. The management enclave 106-1-1 runs the same code as the management enclaves 106-2-1 through 106-2-*m* in the key fabric 124. Thus, the management enclave 106-1-1 can communicate securely using the attestation certificates with the management enclaves 106-2-1 through 106-2-*m*. This allows the management enclaves in the key fabric 124 to retrieve an encrypted tenant key from storage, decrypt the encrypted key, and to provide the key 108 to a management enclave in the compute fabric. For example, the management enclave 106-2-1 may retrieve the encrypted key 108-1 from the storage 122-1. The management enclave 106-2-1 can decrypt the encrypted key 108-1 using the machine key for the machine 100-2-1 to obtain the key 108. The key 108 can then be provided to the management enclave 106-1-1.

At the machine 100-1-1, the management enclave 106-1-1 can provide the key 108 into the enclave 102-1-1. The enclave 102-1-1 can then obtain data for the tenant from the storage 120 and decrypt the data using the key 108. In one embodiment, the enclave architecture defined by the CPU may offer a privileged instruction available only to a management enclave which permits it to deliver a key directly into the address space of the enclave. In another embodiment, the management enclave and the enclave could establish a secure connection using mutual authentication (via attestation) and the management enclave could deliver the key over the secure connection.

Any tenant who wants key portability in their enclave must either trust the cloud service 200 to do key management on their behalf, or must supply their own key management system. Either model can be implemented without requiring that the customer trust the cloud service to keep the keys secret, since the hardware would do that for them. Thus, in summary, a design may be as follows:

The design includes a key management fabric, which includes a set of servers which host per-customer key management enclaves (which could be written by the cloud provider or could be customer-supplied). Each server is capable of running a (non-migratable) management enclave per customer which stores a master key for that customer.

2. When a new customer master key is desired, the key management fabric starts an instance of the customer's management enclave on each key management server. One instance generates a new random key, and then distributes it to all others (using enclave attestation to verify that each endpoint is the correct management enclave for that customer). Now the customer's master key is replicated sufficiently.

3. Each management enclave obtains a CPU-derived encryption key for sealing the master key. This sealing key is generated by the enclave architecture, and includes a machine-specific secret and the cryptographic hash of the management enclave. Now each master key is persisted on each key management server using a hardware-protected key.

4. When the customer workload enclave requires the master key, it contacts the key management fabric to obtain a connection to an instance of the customer-specific management enclave. It establishes a secure connection to that enclave, uses attestation to verify that it is obtaining keys from the correct management enclave, then obtains the key.

Such a system may have one or more of the following properties:

A. It is impossible for the a cloud datacenter to be compelled to disclose any master key, because each master key is sealed with an encryption key specific to the precise key management code (by virtue of the CPU's enclave key protection). Any attempt to modify the management enclave to permit disclosure would result in a change to the sealing key, thus preventing the master key from being successfully decrypted. Furthermore, any attempt to convince a disclosure-resistant version of the management enclave to divulge a master key to a disclosure-capable version of the enclave would be prevented by attestation (since each management enclave would only divulge a master key to a version of a management enclave that it knows to be disclosure-resistant).

B. Each customer workload can verify that the management enclave does not permit disclosure of the master key, because it can attest that its keys are being provided by a specific, disclosure-resistant version of the management enclave. A paranoid customer can obtain this guarantee by supplying the management enclaves themselves.

C. The master keys are protected from disaster, because the key management fabric provides sufficient replication to guarantee key availability.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
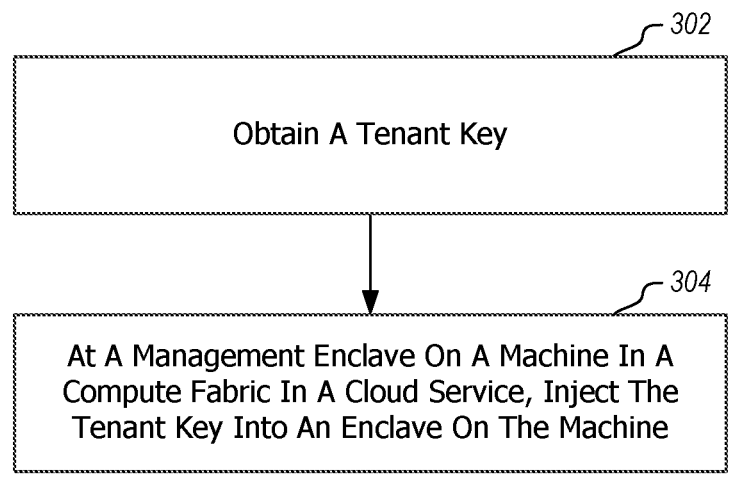
FIG. 3 illustrates a method of securely managing tenants on a cloud system.

Referring now to FIG. 3, a method 300 is illustrated. The method 300 includes acts for securely managing tenants on a cloud system. The method includes obtaining a tenant key (act 302). For example, for purposes of the method 300, the tenant key may be obtained from a tenant of a cloud service. Alternatively or additionally, the tenant key may be generated at the cloud service and obtained by a management enclave. Alternatively or additionally, a particular management enclave may obtain a tenant key from another management enclave. As will be discuss in more detail below, this may be enabled by the management enclaves running the same application code. Note that the same application code may include different versions of the same application code. That is, one management enclave may be running one version of application code, while a different management enclave is running a different version of the same application code. However, the management enclaves may nonetheless be able to pass tenant keys to each other by verifying application code (whether the same version or different).

The method 300 further includes, at a management enclave on a machine in a compute fabric in a cloud service, providing the tenant key into an enclave on the machine (act 304). The management enclave and enclave are, for a given enclave, a protected area of an application address space for which access is prevented for any application code not resident in the given enclave itself, except that the management enclave can provide keys to the tenant enclave. In some embodiments, the management enclave may be limited to only be able to provide tenant keys into an enclave running on the same machine as the management enclave. Thus, for example, management enclave 106-1-1 would be able to provide the key 108 into the enclave 102-1-1 as they are both running on the same machine 100-1-1. However, management enclave 106-1-1 would not be able to provide the key 108 into the enclave 102-1-2 as they are on different machines.

The enclave is configured to perform functionality for a cloud service tenant. Note that application code may be in a different instance of an enclave, but so long as it is the same application code, it can access the enclave. For example, management enclave 106-2-1 may be able to provide a key 108 to management enclave 106-1-1 if both of these management enclaves are running the same application code. As noted, this can be confirmed using attestation certificates, such as attestation certificate 110-1 illustrated in FIG. 2.

Note further, that as used herein, the same "application code" may include different versions of the same code. However, the application code in the management enclaves can be configured to allow for communications with different versions of the same application code. For example, management enclave 106-2-1 may be able to provide a key 108 to management enclave 106-1-1 if both of these management enclaves are running different versions of the same application code. As noted, this can be confirmed using attestation certificates, such as attestation certificate 110-1 illustrated in FIG. 2. For example, some embodiments may verify an attestation certificate including an enclave attestation for a management enclave. The enclave attestation comprises verifiable proof of a signing authority, verifiable proof of a signing authority declaration of what functionality application code has, and verifiable proof of a signing authority declared version of the application code.

Thus, the method 300 may be practiced where obtaining a tenant key comprises obtaining a tenant key from another management enclave running a version of the same application code by verifying that the another management enclave is running mutually approvable and authenticatable management enclave code such that tenant keys can be passed between management enclaves in a trusted fashion by the management enclaves approving and authenticating management enclave code.

In some such embodiments, verifying that the another management enclave is running mutually approvable and authenticatable application code includes verifying that the another management enclave is running identical application code.

Alternatively or additionally, in some such embodiments, verifying that the another management enclave is running mutually approvable and authenticatable management enclave code includes verifying that the another management enclave is running a different version of application code that can be verified as a different version of application code.

In some such embodiments, verifying that the another management enclave is running a different version of the management enclave code includes verifying an attestation certificate including an enclave attestation for a management enclave. The enclave attestation includes verifiable proof of a signing authority, verifiable proof of a signing authority declaration of what functionality application code has, and verifiable proof of a signing authority declared version of the application code.

In some embodiments, the management enclave and the enclave are peers that use mutual authentication and attestation to verify that the key issuing management enclave is a trustworthy issuer, and the recipient enclave is a trustworthy recipient of the key. This may be performed, for example, by using attestation certificates as described above. In particular, the management enclave and enclave may each verify that the other is using mutually approved and verifiable code. This may be by the management enclave and enclave running the same code as defined above, or by some other mutually agreed upon code.

The embodiments illustrated here may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
a compute fabric comprising a first plurality of hardware machines, each of the first plurality of hardware machines running a first management enclave and a tenant enclave, wherein for each of the first plurality of hardware machines the first management enclave is configured to provide one or more tenant keys into the tenant enclave; the tenant enclave corresponds to a protected area of an application address space for which access is prevented for any application code not resident in the tenant enclave; and the first management enclave corresponds to a protected area of an application address space for which access is prevented for any application code not resident in the first management enclave, except that the first management enclave is permitted to provide the one or more tenant keys to the tenant enclave; and
a key fabric comprising a second plurality of hardware machines, each of the second plurality of hardware machines running a second management enclave, wherein for each of the second plurality of hardware machines the second management enclave is configured to cause one or more encrypted tenant keys to be stored locally and exclusively on the second hardware machine, and wherein each of the first and second management enclaves run mutually approvable and authenticatable management enclave application code, thereby allowing tenant keys to be passed between management enclaves of different hardware machines in a trusted fashion by the management enclaves approving and authenticating management enclave application code.

2. The system of claim 1, wherein each of the first and second management enclaves run mutually approvable and authenticatable management enclave application code by running identical application code.

3. The system of claim 1, wherein each of the first and second management enclaves run mutually approvable and authenticatable management enclave application code by running different versions of a same application code that can be verified as different versions of the same application code.

4. The system of claim 3, wherein each of the first and second management enclaves are configured to verify different versions of the same application code by verifying an attestation certificate including an enclave attestation for a management enclave, wherein the enclave attestation comprises verifiable proof of a signing authority, verifiable proof of a signing authority declaration of what functionality application code has, and verifiable proof of a signing authority declared version of application code.

5. The system of claim 1, wherein each of the second management enclaves is configured to encrypt and decrypt tenant keys using a machine key for a machine on which each second management enclave is running.

6. The system of claim 1, wherein the system is configured to generate tenant keys.

7. The system of claim 1, wherein the system is configured to receive tenant keys from tenants.

8. A hardware machine comprising:
one or more hardware processors, comprising:
a tenant enclave which corresponds to a protected area of an application address space for which access is prevented for any application code not resident in the tenant enclave itself, except that keys can be provided by one or more management enclaves into the tenant enclave; and
a management enclave coupled to the tenant enclave, wherein the management enclave is configured to provide a key to the tenant enclave, and wherein the management enclave corresponds to a protected area of an application address space for which access is prevented for any application code not resident in the management enclave itself.

9. The hardware machine of claim 8, wherein the management enclave is configured to communicate with other management enclaves running mutually approvable and authenticatable application code such that tenant keys can be passed between management enclaves in a trusted fashion by management enclaves approving and authenticating management enclave application code.

10. The hardware machine of claim 9, wherein the management enclave is configured to communicate with other management enclaves running identical application code.

11. The hardware machine of claim 9, wherein the management enclave is configured to communicate with other management enclaves running different versions of a same application code that can be verified as different versions of the same application code.

12. The hardware machine of claim 11, wherein the management enclave is configured to verify different versions of the same application code by verifying an attestation certificate including an enclave attestation for a management enclave, wherein the enclave attestation comprises verifiable proof of a signing authority, verifiable proof of a signing authority declaration of what functionality application code has, and verifiable proof of a signing authority declared version of application code.

13. The hardware machine of claim 8, wherein the management enclave is configured to encrypt and decrypt tenant keys using a machine key for the hardware machine.

14. The hardware machine of claim 8, wherein the tenant enclave is configured to perform functions for a cloud service tenant, and wherein the management enclave is configured to provide a tenant key into the tenant enclave.

15. A method of securely managing tenants on a cloud system, the method comprising:
obtaining a tenant key; and
at a management enclave on a hardware machine in a compute fabric in a cloud service, providing the tenant key into a tenant enclave on the hardware machine, wherein the management enclave corresponds to a protected area of an application address space for which access is prevented for any application code not resident in the management enclave itself and a tenant enclave corresponds to a protected area of an application address space for which access is prevented for any application code not resident in the tenant enclave itself, except that the management enclave can provide keys to the tenant enclave, and wherein the tenant enclave is configured to perform functionality for a cloud service tenant.

16. The method of claim 15, wherein obtaining a tenant key comprises obtaining a tenant key from another management enclave running a version of a same application code as the management enclave by verifying that the another management enclave is running mutually approvable and authenticatable management enclave code such that tenant keys can be passed between the management enclave and the another management enclave in a trusted fashion by the management enclave approving and authenticating management enclave code.

17. The method of claim 16, wherein verifying that the another management enclave is running mutually approvable and authenticatable application code comprises verifying that the another management enclave is running identical application code to application code being run by the management enclave.

18. The method of claim 16, wherein verifying that the another management enclave is running mutually approvable and authenticatable management enclave code comprises verifying that the another management enclave is running a different version of application code than the management enclave, but that can be verified as a different version of application code than the management enclave.

19. The method of claim 18, wherein verifying that the another management enclave is running a different version of the management enclave code comprises verifying an attestation certificate including an enclave attestation for the another management enclave, wherein the enclave attestation comprises verifiable proof of a signing authority, verifiable proof of a signing authority declaration of what functionality application code has, and verifiable proof of a signing authority declared version of application code.

20. The method of claim 15, wherein obtaining a tenant key comprises obtaining a tenant key from a cloud tenant.

* * * * *